J. BURNS.
Cultivator.
No. 39,337. Patented July 28, 1863.
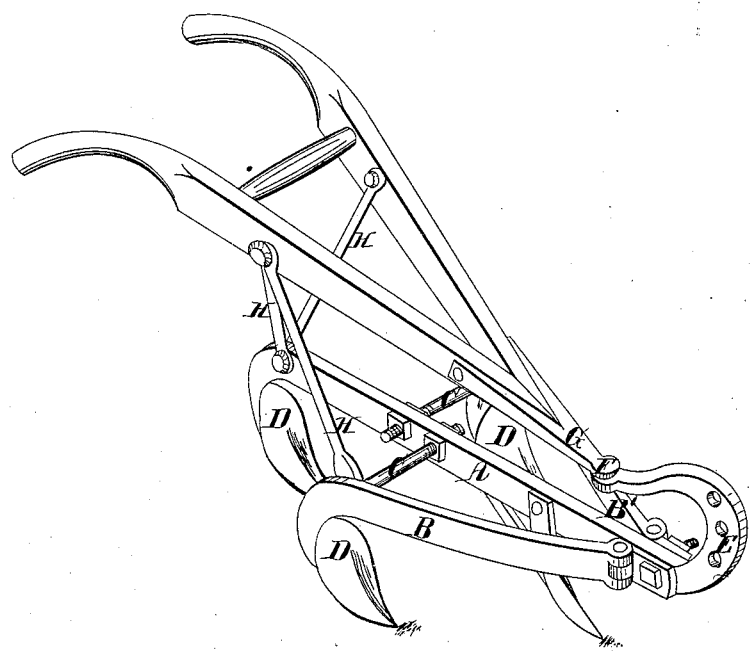
Witnesses;
Saml Upton
J. Brown
Inventor;
John Burns
pr Knight Bros atty

UNITED STATES PATENT OFFICE.

JOHN BURNS, OF FRANKLIN, OHIO.

IMPROVEMENT IN CULTIVATORS.

Specification forming part of Letters Patent No. 39,337, dated July 28, 1863.

*To all whom it may concern:*

Be it known that I, JOHN BURNS, of Franklin, Warren county, Ohio, have invented a new and useful Cultivator; and I do hereby declare the following to be a full, clear, and exact description thereof, reference being had to the annexed drawing, making part of this specification.

A B B' are three iron bars or beams of the form known to the trade as "anchor-shaped." Of these the two outer ones, B B', are shortest, and at their forward ends hinged to the central beam, A, while their rear ends are held at any desired divergence from the central beam by means of screwed stay-bolts C. The depending rear ends of the beams carry shares D. The front end of the central beam, A, is recurved upward in the form of a beak or prow, and perforated so as to form a clevis, E, for adjustable attachment of the team. The clevis E curves upward and backward and terminates in an eye, F, for the attachment of the front ends of the handles G. Rods H, extending from the handles G to the rear ends of the beams A B B', serve to brace the whole together by a system of triangles, which insures great strength combined with lightness.

The clevis, which is the part most needing strength, is doubly supported by its connection with the beam A below, and with both handles G above.

I claim herein as new and of my invention, and desire to secure by Letters Patent—

The attachment of the handles G, at their forward end, to the upper end of the perforated prow-shaped clevis E, which is formed on and made a part of the central beam, A, in the manner described, in combination with the stay-rods H and beams A B B', when arranged in the manner and for the purpose specified.

In testimony of which invention I hereunto set my hand.

JOHN BURNS.

Witnesses:
   GEO. H. KNIGHT,
   J. S. REECE.